(12) United States Patent
Sansone

(10) Patent No.: US 6,993,491 B2
(45) Date of Patent: Jan. 31, 2006

(54) METHOD FOR A CARRIER TO DETERMINE THE LOCATION OF A MISSING PERSON

(75) Inventor: Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 1009 days.

(21) Appl. No.: 09/818,727

(22) Filed: Mar. 27, 2001

(65) Prior Publication Data

US 2002/0143559 A1 Oct. 3, 2002

(51) Int. Cl.
*G06F 17/60* (2006.01)
*G07B 17/02* (2006.01)

(52) U.S. Cl. .......................................... 705/1; 705/404
(58) Field of Classification Search .................... 705/1, 705/401, 402, 404; 382/101
See application file for complete search history.

(56) References Cited

U.S. PATENT DOCUMENTS

| | | | | |
|---|---|---|---|---|
| 4,037,956 A | * | 7/1977 | McKeen, Jr. ................. | 355/77 |
| 4,962,532 A | | 10/1990 | Kasiraj et al. | |
| 5,079,714 A | | 1/1992 | Manduley et al. | |
| 5,086,300 A | | 2/1992 | Ashmore | |
| 5,293,250 A | | 3/1994 | Okumura et al. | |

(Continued)

FOREIGN PATENT DOCUMENTS

| | | |
|---|---|---|
| CA | 1178711 A * | 11/1984 |
| EP | 0 375 139 A2 | 11/1989 |
| WO | WO 99/21330 | 10/1998 |

OTHER PUBLICATIONS www.PeopleFinderNow.com, Skip Tracing and People Locates, pp. 1–6.*

Pace, Andrew "It's a Matter of Privacy", Jun. 2001, The Gale Group.*

Wattendorf, George,"Stalking Investifation Strategies", Mar. 2000, FBI Law Enforcement Buletin, Dialog No. 04717583.*

Graham, Robert, Carnivore FAQ (Frequently Asked Questions), www.robertgraham.com/pubs/carnivore–faq.html.*

(Continued)

*Primary Examiner*—John G. Weiss
*Assistant Examiner*—Jamisue A. Webb
(74) *Attorney, Agent, or Firm*—Ronald Reichman; Angelo N. Chaclas

(57) ABSTRACT

A method that enables a carrier to find the address of a missing person. The carrier accomplishes the foregoing by receiving the name of a missing person; receiving a list of parties that the missing person is likely to receive mail from or send mail to; scanning mail faces that have been deposited with the carrier by a sender; determining if the scanned mail includes the name of the missing person and a party appearing on the list of parties; producing a list of scanned names and addresses that include the name of the missing person and the party appearing on the list of parties; delivering the list to a party that is permitted by law to receive the list regarding the missing person; and reviewing the delivered list to determine if the missing person is the recipient or sender of mail that is likely to be the missing person.

10 Claims, 14 Drawing Sheets

U.S. PATENT DOCUMENTS

| | | | |
|---|---|---|---|
| 5,612,889 A | 3/1997 | Pintsov et al. ......... 364/478.14 |
| 5,636,038 A | 6/1997 | Lynt et al. |
| 5,648,916 A | 7/1997 | Manduley ............... 364/514 A |
| 5,838,768 A | 11/1998 | Sumar et al. .................. 379/89 |
| 5,943,408 A | 8/1999 | Chen et al. |
| 5,944,786 A | 8/1999 | Quinn |
| 5,974,449 A | 10/1999 | Chang et al. |
| 5,987,508 A | 11/1999 | Agraharam et al. |
| 6,020,980 A | 2/2000 | Freeman |
| 6,047,272 A | 4/2000 | Biliris et al. |
| 6,052,442 A | 4/2000 | Cooper et al. |
| 6,061,448 A | 5/2000 | Smith et al. |
| 6,061,790 A | 5/2000 | Bodnar |
| 6,064,995 A | 5/2000 | Sansone et al. |
| 6,072,862 A | 6/2000 | Srinivasan ............. 379/100.08 |
| 6,073,165 A | 6/2000 | Narasimhan et al. |
| 6,081,899 A | 6/2000 | Byrd |
| 6,085,231 A | 7/2000 | Agraharam et al. |
| 6,108,688 A | 8/2000 | Nielsen |
| 6,259,533 B1 | 7/2001 | Toyoda et al. |
| 6,289,323 B1 | 9/2001 | Gordon et al. |
| 6,293,037 B1 | 9/2001 | Spada et al. |
| 6,321,211 B1 | 11/2001 | Dodd |
| 6,333,973 B1 | 12/2001 | Smith et al. |
| 6,390,921 B1 | 5/2002 | Busch et al. |
| 6,411,393 B1 | 6/2002 | Wakasugi |
| 6,434,603 B1 | 8/2002 | Tsuji et al. |
| 6,459,364 B2 | 10/2002 | Gupta |
| 6,532,489 B1 | 3/2003 | Merchant |
| 6,542,584 B1 | 4/2003 | Sherwood et al. |
| 6,549,612 B2 | 4/2003 | Gifford et al. |
| 6,621,892 B1 | 9/2003 | Banister et al. |
| 6,647,385 B2 * | 11/2003 | Seestrom et al. ............... 707/7 |
| 6,697,858 B1 | 2/2004 | Ezerer et al. |
| 6,710,894 B1 | 3/2004 | Ogawa |
| 6,711,154 B1 | 3/2004 | O'Neal |
| 6,721,784 B1 | 4/2004 | Leonard et al. |
| 6,741,724 B1 * | 5/2004 | Bruce et al. ................. 382/101 |
| 2001/0021261 A1 * | 9/2001 | Koga et al. ................. 382/101 |
| 2002/0165729 A1 | 11/2002 | Kuebert et al. |

OTHER PUBLICATIONS

The Session Initiation Protocol: Internet–Centric Signaling—Schulzrinne, et al. (2000); www.cs.columbia.edu/–jdrosen/papers/commag_final.pdf.

TURMS: A Non–invasive Certified Email System—Nita–Rotaru; www.cnds. jhu.edu/–crisn/papers/turms.ps.gz.

EmailValet: Learning User Preferences for Wireless Email—Mackassy, Dayanik, Hirsh (1999); www.ai.cs.uni-dortmund.de/EVENTS/IJCA199–MLIF/papers/macs-cassy.ps.gz.

Formal Development of Secure Email—Shou, Kuo, Older, Chin (1999); web.syr.edu/–dzhou/papers/hicss99.ps.gz.

Practical Protocols For Certified Electronic Mail—Deng, Gong, Lazar, Wang (1996); java.sun.com/people/gong/papers/certified–email.ps.gz.

POST: A secure, resilient, cooperative messaging syste — Alan Mislove Ansley; www.usenix.org/events/hotos03/tech/full_papers/mislove/mislove.pdf.

Formal Analysis of a Secure Communication Channel: Secure . . .–Dan Zhou; ocelot.cat.syr.edu/ –danzhou/papers/fmgg.ps.

Pitney Bowes Inc. Software Solutions regarding ReUnion™ *Data Quality to a New Level* dated 1998.

Pitney Bowes Inc. Software Solutions regarding FinalFocus™ *Your Single Source for Geographic, Demographic and Lifestyle Information* dated 1998.

* cited by examiner

CONFIDENTIAL MISSING PERSON SEARCH REPORT

TO CLIENT: MRS. JOYCE ALLEN-HOMEOWNER (WIFE)   MAY 3, 2002

| SEARCH ID | MAILPIECE# | S/R | NAME | CURRENT MAILING ADDRESS | VERIFIED |
|---|---|---|---|---|---|
| A. 999-999-99 | 10001001120 | LP | Mr. JAMES HOMEOWNER | UNKNOWN | |
| | | S | AJAX WIDGIT CO | 1 MAIN STREET // STAMFORD CT 06926 1010 | YES |
| | | R | Mr. J HOMEOWNER | 123 Palm ST // Fort Lauderdale FL 03333 1231 | YES |

DATABASE DERIVED INFORMATION FROM MAIL PIECE

1. AJAX WIDGIT CO IS IN J HOMEOWNER "PAST BUSINESS RELATIONS" LIST
2. AJAX IS THE REGISTERED METER (PB 00000000) HOLDER. METER INDICIA ACCOUNT IS CURRENTLY VALID
3. MARY HOMEOWNER (THE M.P. MOTHER) IS AN AJAX WIDGIT EMPLOYEE
4. SS # MATCH WAS FOUND IN FLORIDA DMV RECORD FOR RECIPIENT AT 123 PALM ST AND JAMES HOMEOWNER

| B. 999-999-99 | 12341001124 | LP | Mr. JAMES HOMEOWNER | UNKNOWN | |

Fig.9

METHOD FOR A CARRIER TO DETERMINE THE LOCATION OF A MISSING PERSON

CROSS REFERENCE TO RELATED APPLICATIONS

Reference is made to commonly assigned copending patent application Ser. No. 09/818,792 filed herewith entitled "Recipient Elected Messaging Services" in the names of Ronald P. Sansone, Robert A. Cordery and Donald G. Mackay; Ser. No. 09/818,721 filed herewith entitled "Sender Elected Messaging Services" in the names of Ronald P. Sansone, Robert A. Cordery and Donald G. Mackay; Ser. No. 09/817,998 filed herewith entitled "Messaging Services for Visually Impaired" in the name of Ronald P. Sansone; Ser. No. 09/818,810 filed herewith entitled "Messaging Services For Uniquely Identified Mail" in the name of Ronald P. Sansone; Ser. No. 09/818,480 filed herewith entitled "Recipient Elected Messaging Services For Mail That Is Transported In Trays Or Tubs" in the name of Ronald P. Sansone; and Ser. No. 09/818,195 filed herewith entitled "Method For Determining If Mail Contains Life Harming Materials" in the name of Ronald P. Sansone.

FIELD OF THE INVENTION

The invention relates generally to the field of mail delivery systems and, more particularly, to systems that may determine the mailing address of missing persons.

BACKGROUND OF THE INVENTION

People have directly transmitted information from one person to another. Information was first transmitted by spoken word and later by written word. Writings enabled people to transmit information by messengers from a location in which the sender of the writing was present to another location where the receiver was present. In time, postal services were developed in which a person would deliver letters to the post office in one city, and an agent of the post office would deliver that letter to a post office in another city, where the letter mail would be picked up by the person to whom the letter was sent.

Ever since the numeric codification of streets and buildings received general acceptance, an individual's name and household postal address have been linked. The sender of a letter or package would deliver a letter or package to the post that had the correct recipient postal address, and the post would deliver the letter or package to the numeric street address of the recipient of the letter or package. A correct recipient postal address for the delivery of the letter or package to the recipient included the name of the recipient, the street address of the recipient, the city and state of the recipient, and the zip code of the recipient. Thus, the correct recipient postal address is usually the actual location of the recipient.

Each year, many people leave their home without leaving any forwarding address. A large number of people are not leaving a forwarding address, because they are running away from their responsibilities and/or running away from the law. Some reasons why people are not leaving a forwarding address are they do not want to pay child support; they do not want to see their wives, husbands, children, parents, etc.; they are avoiding people or business entities to whom/which they owe money; and/or they have committed a crime and are avoiding law enforcement agencies, etc. People who are not leaving a forwarding address usually do not want to lose contact with everyone. Thus, they will give some people their new address and, if they changed their name, they will give their new name to some people. Sometimes, the people who have left no forwarding address with the post and/or courier give their forwarding address to other people who send letters, flats and packages, hereinafter referred to as "mail", to each other, via the post and/or a courier i.e., Federal Express®, Airborne®, United Parcel Service®, DHL®, etc., hereinafter referred to as "carrier".

Even though many laws exists to help law enforcement agencies and/or victims to find people who are avoiding the law, to help parents find children who have run away from home, to help find parents who are avoiding their responsibilities to their children and/or spouses, and/or to help creditors find debtors, etc., heretofore carriers have not been used to find people who have left no forwarding address.

SUMMARY OF THE INVENTION

This invention overcomes the disadvantages of the prior art by providing a method that enables carriers to determine the mailing address of missing persons. The carriers utilizes the fact that, oftentimes, missing persons still communicate with some people. For instance, a spouse who is avoiding paying alimony may still communicate with his/her parents and/or some friends or relatives. Thus, the carrier may utilize a list of names and addresses of people and entities that the missing person may communicate with to help locate the missing person.

This invention accomplishes the foregoing by receiving the name of a missing person; receiving a list of parties that the missing person is likely to receive mail from or send mail to; scanning mail faces that have been deposited with the carrier by a sender; determining if the scanned mail includes the name of the missing person and a party appearing on the list of parties; producing a list of scanned names and addresses that include the name of the missing person and the party appearing on the list of parties; delivering the list to a party that is permitted by law to receive the list regarding the missing person; and reviewing the delivered list to determine if the missing person is the recipient or sender of mail that is likely to be the missing person.

BRIEF DESCRIPTION OF THE DRAWING

FIG. 9 is a drawing of a missing person search report.

DETAILED DESCRIPTION OF THE PREFERRED EMBODIMENT

Figure 1A:
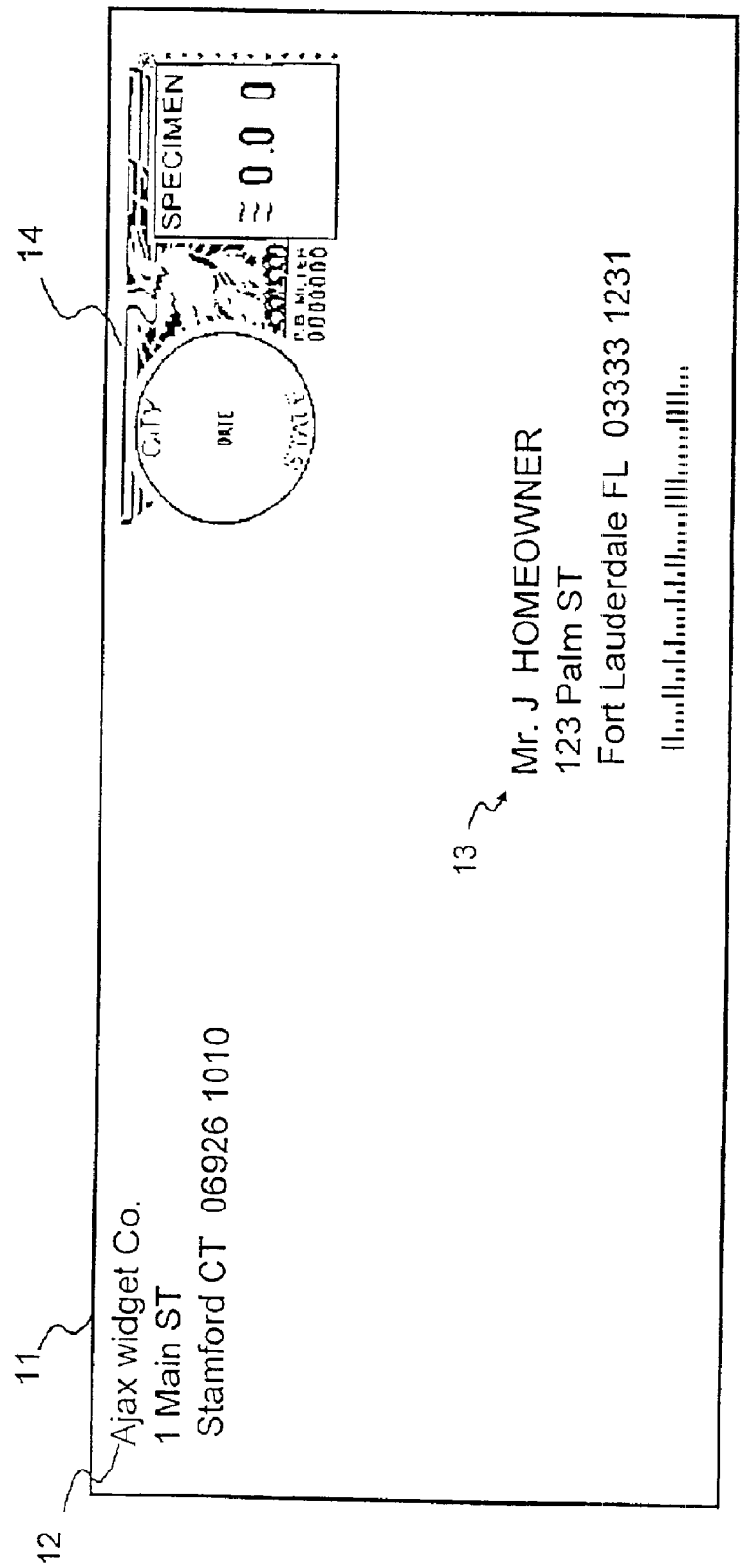
FIG. 1A is a drawing of a metered mailpiece.

Referring now to the drawings in detail and more particularly to FIG. 1A, the reference character 11 represents a mailpiece that has a sender address field 12, a recipient address field 13, and a postal indicia 14.

Figure 1B:
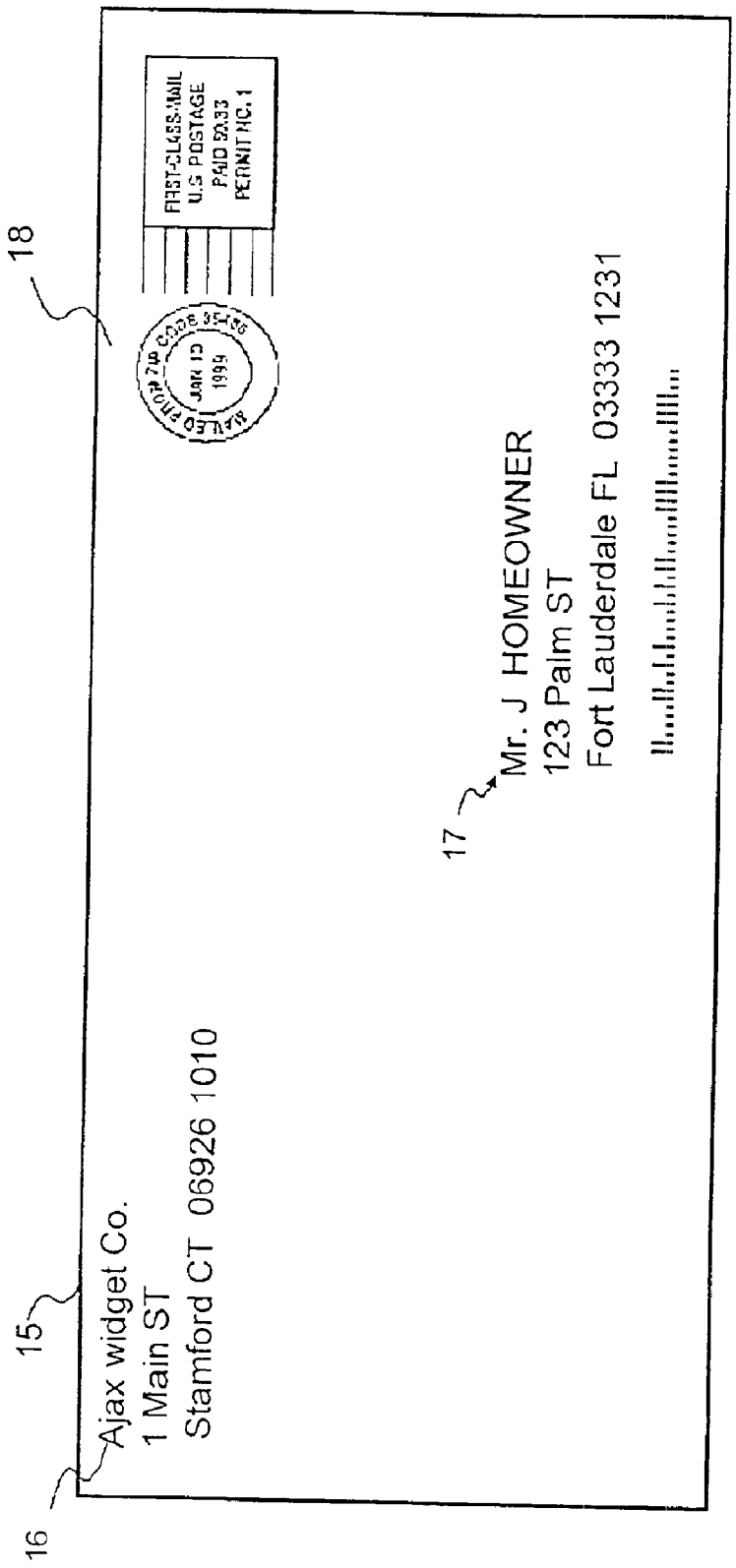
FIG. 1B is a drawing of a permit mailpiece.

FIG. 1B is a drawing of a permit mailpiece. Mailpiece 15 has a sender address field 16, a recipient address field 17, and a permit 18.

Figure 1C:
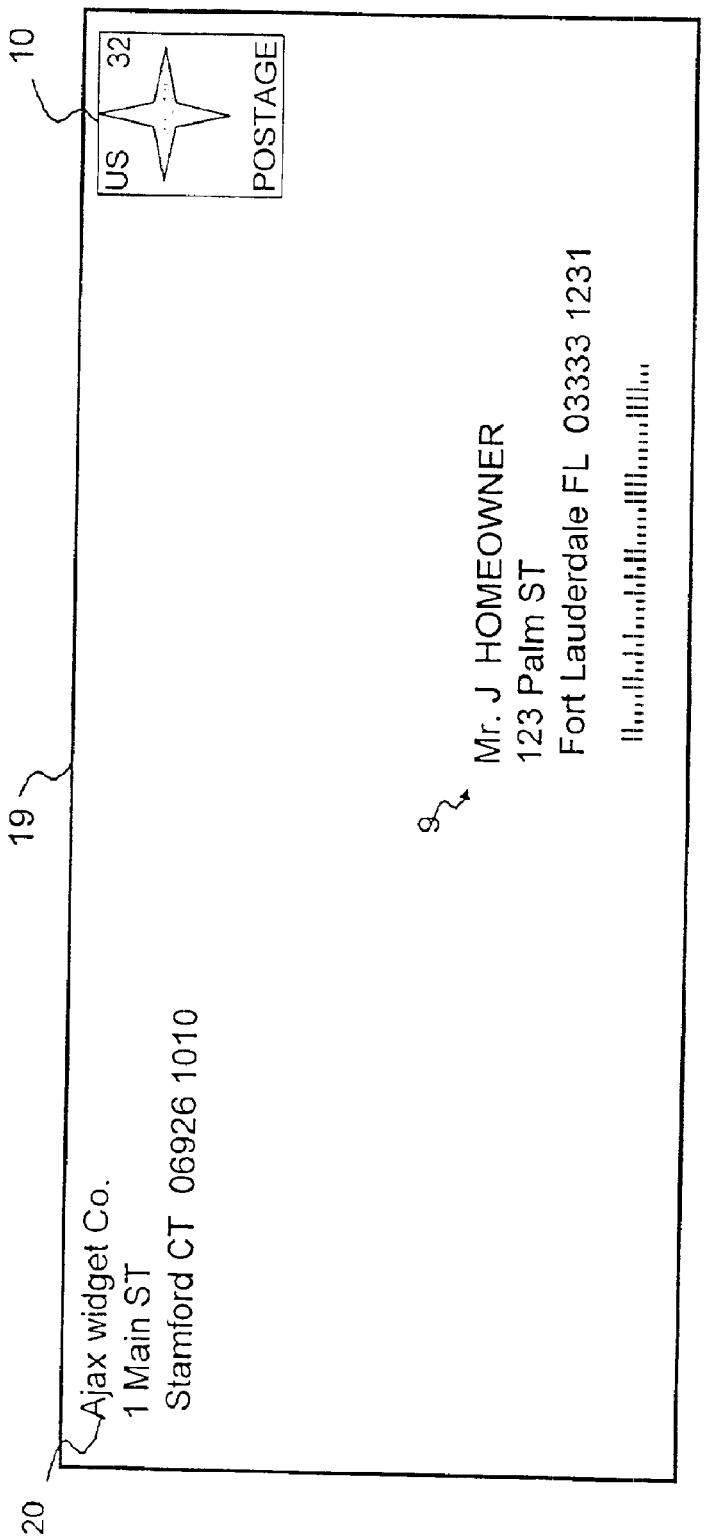
FIG. 1C is a drawing of a stamped mailpiece.

FIG. 1C is a drawing of a stamped mailpiece. Mailpiece 19 has a sender address field 20, a recipient address field 9, and a stamp 10.

Figure 1D:
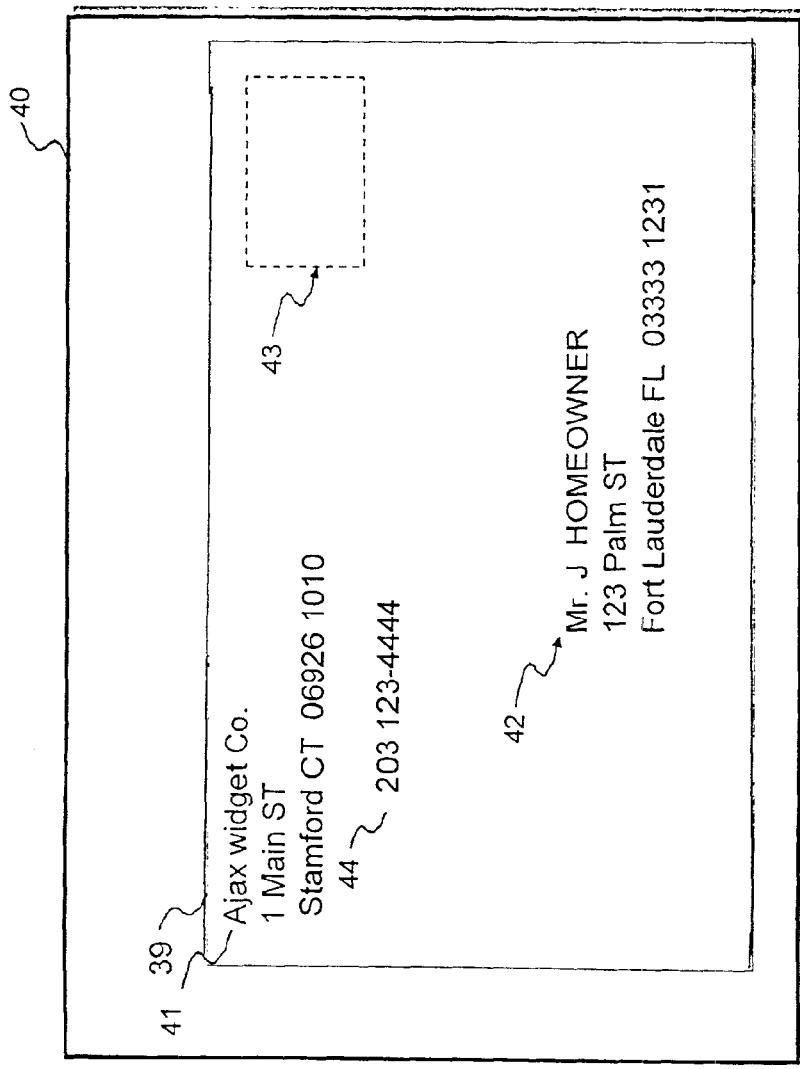
FIG. 1D is a drawing of a flat or package that is going to be delivered by a carrier.

FIG. 1D is a drawing of a flat or package that is going to be delivered by a carrier. Package 40 has a label 39 affixed thereto. Label 39 has a sender address field 41, a recipient address field 42, and may have other sender information, i.e., the sender's phone number 44. Indicia 43 is affixed to label 39. Indicia 43 may be a postal indicia or courier symbology.

Figure 2:
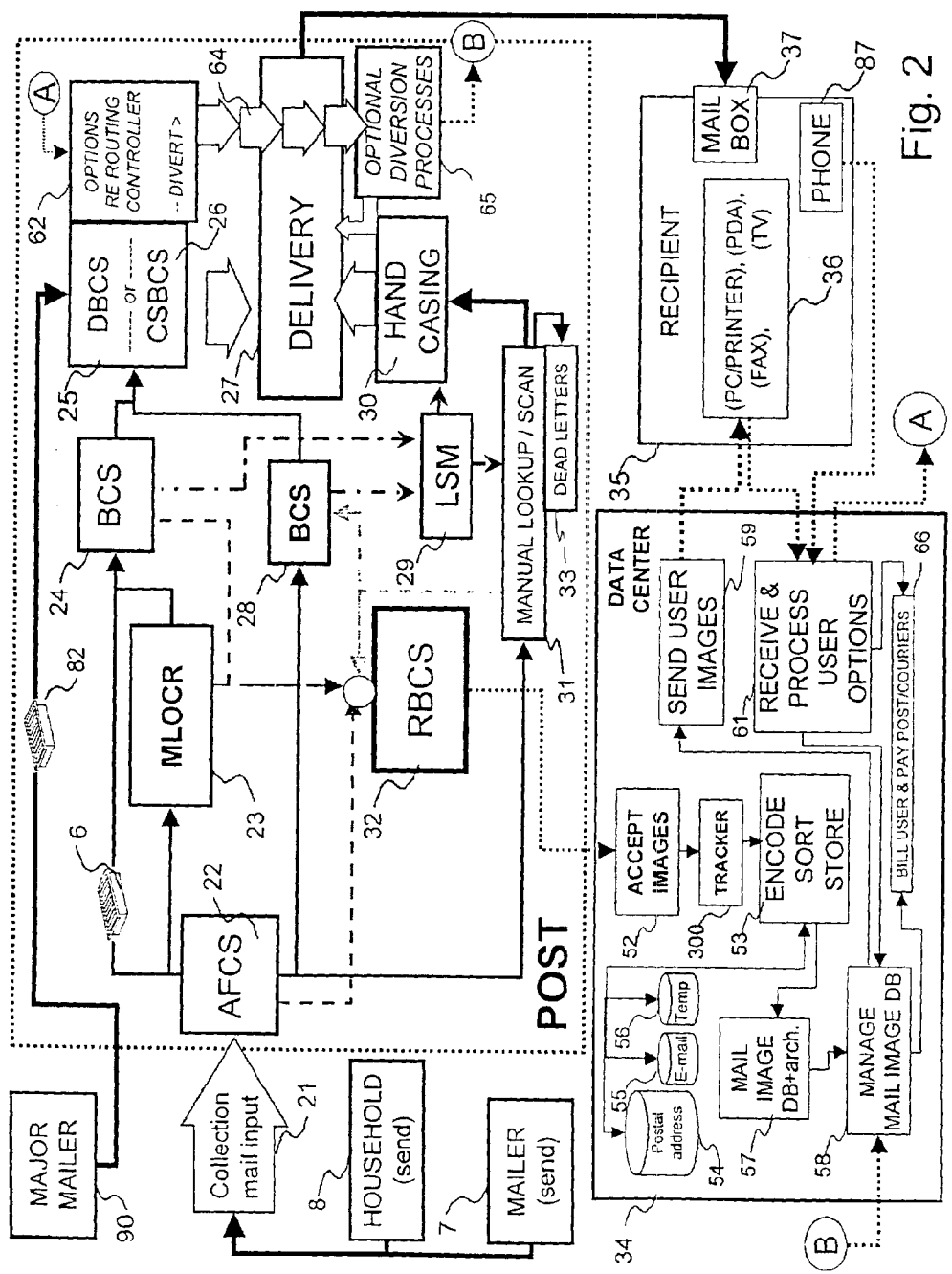
FIG. 2 is a drawing showing how this invention may be used by a post in the processing of letter mail.

FIG. 2 is a drawing showing how this invention may be used by a post in the processing of letter mail. Letter mail that is deposited in trays 6 and delivered to the post is read by multiple optical character reader (hereinafter "MLOCR") 23. Collection letter mail may be metered letter mail that is produced at a mailer site 7 or a sender household 8 by a postage meter or a personal computer meter, stamped mail, or permit mail. Collection letter mail is placed in collection mail input 21, i.e., mail boxes or delivered to the United States Postal Service unsorted. Collection letter mail is sent to advanced facer canceller (hereinafter "AFCS") 22. AFCS 22 first faces the letter mail. Then AFCS 22 electronically identifies and separates prebarcoded mail, handwritten addresses and machine-imprinted address pieces for faster processing through automation. Letter mail that AFCS 22 determines is optical character readable is sent to multi-line optical character reader/code printer (hereinafter "MLOCR") 23. MLOCR 23 reads the entire address on the letter mail, sprays a bar code on the mail, and then sorts the mail. Letter mail that is able to be scanned and sorted by MLOCR 23 is sent to bar code sorter/code printer "hereinafter "BCS") 24. Letter mail that the mailer has prebarcoded and contains a facing identification mark is sent to BCS 24.

Trayed mail 82 (mail in which the sender is entitled to discounts) that is produced at a major mailer site 90 (FIG. 5) is sent to a delivery bar code sorter/code printer 25 or a carrier sequence bar code sorter/code printer 26. Sorters 25 and 26 sort the letter mail in the order that the mail is going to be delivered by postal carrier 27. Letter mail that AFCS 22 determines is not optical character readable is sent to bar code sorter/code printer 28. Letter mail that AFCS 22 obtains electronic images from and letter mail that MLOCR 23 obtains electronic images from transfers the electronic images to remote bar code system (hereinafter "RBCS") 32. RBCS 32 matches the look up zip code for the letter mailpieces from AFCS 22 and merges them. RBCS 32 electronically transmits the bar code information to sorter 28 where the bar code information is sprayed on the mailpieces. Letter mail that is able to be scanned and sorted by sorters 24 and 28 is sent to a delivery bar code sorter 25. Sorters 25 and 26 sort the letter mail in the order that the mail is going to be delivered by postal carrier 27, or hold the mail for recipient diversion for a specified period of time in divert mail options rerouting controller 62.

Letter mail that can not be scanned and sorted by sorters 24 and 28 is sent to LSM (hereinafter "LSM") 29. Letter mail that can be sorted by LSM 29 is sent to postal hand casing 30. Postal hand casing 30 is the process in which the postal carrier sorts the letter mail in the order that the letter mail is going to be delivered by postal carrier 27. Letter mail that can not be sorted by LSM 29 is sent to manual process 31. Manual process 31 attempts to classify the previously rejected letter mailpiece to redirect the mailpiece, declare the mailpiece dead, or manually re-code the mailpiece for redelivery. Then the letter mailpieces that have not been processed in manual lookup, scan and sortation process 31 are sent to dead letters 33. In process 31, an operator may determine the address of the recipient and produce a label to be placed on the letter mail. Then the letter mail would go to postal hold casing 30 where the mail is sorted in the order that the mail is going to be delivered by postal carrier 27.

Letter mail that can not be faced and cancelled by AFCS 22 is sent to manual process 31. Manual process 31 attempts to classify the previously rejected letter mailpiece to redirect the mailpiece, declare the mailpiece dead, or manually re-code the mailpiece for redelivery. Then the letter mail that manual process 31 is able to classify is sent to postal carrier casing 30 before it is delivered by postal carrier 27.

RBCS 32 electronically transmits the bar code information that represents the destination of the letter mailpiece, the party to whom the mailpiece is to be delivered, and the image of the face of the mailpiece to data center 34. The aforementioned scanners scan all of the information appearing on the face of the letter mail, i.e., (from FIG. 1A), the sender's name and address 12, the recipient's name and address 13, and postal indicia 14. The scanned information is transferred to accept process images 52. Now the scanned information is transferred to missing persons tracker process 300. Process 300 hereinafter will be described in the description of FIG. 6. Then the information is sent to encode, sort, store 53. At this point, the recipient's physical address is verified by checking postal address data base 54, and the recipient's e-mail address is determined from e-mail data base 55. Temporary data base 56 is then searched to determine whether or not the recipient has left any forwarding addresses. Encode 53 then encodes and sorts the information obtained from data bases 54, 55 and 56.

The aforementioned encoded and sorted information is stored in mail image data base 57. Then the mail image information is sent to manage mail image 58 where the various options and the costs associated therewith that the recipient may have for delivering the information contained in the letter mail are determined. Then the mail images and options that the recipient has for receiving the letter mail is sent to images 59, where the information appearing on the face of the letter mail in alphanumeric and graphic form and the options in alphanumeric and graphic form the recipient has for receiving the letter mail are transmitted to receiving device 36 (personal computer, television, facsimile machine, personal data assistant, etc.), which is located at the recipient's business or household 35. The options that the recipient has for diverting the letter mail are described in the description of FIG. 4.

The recipient may use device 36 (personal computer, facsimile machine, personal data assistant, etc.) located at the recipient's business or household 35 to inform receive and process recipient options 61, located at data center 34, of the manner in which the letter mail should be delivered. The recipient may also use a touch tone and/or voice telephone 87 to inform options 61 of the manner in which the recipient would like the letter mail displayed on the receiving device 36, i.e., television delivered. For instance, the recipient may want the letter mail physically delivered to the recipient's house faster or slower; or the letter mail physically redirected to the recipient's temporary address; or physically delivered to the recipient's agent; or physically delivered to the recipient's attorney; or physically returned to the mailer; or have the post open the letter mail and have the post e-mail or fax the contents of the letter mail to the recipient and/or parties designated by the recipient.

At this juncture, the recipient may inform options 61 via a device 36 of the manner in which the recipient would like the letter mail processed. Options 61 will then inform the recipient via device 36 of the cost to the recipient to process the letter mail in the manner selected by the recipient. The recipient may then inform the post to deliver the letter mail in the manner selected by the recipient. The recipient's selected manner of letter mail processing is forwarded to options rerouting controller 62. If the post's specified time to deliver the letter mail has not been reached, the letter mail is sent to recipient options 64 and delivered in the manner selected by the recipient in route mail options 65. Then options 65 informs manage mail data base 58 to archive the image and also to notify bill sender and pay carriers 66 to bill the recipient and pay the post. At this point, the next letter mail image is ready to be processed.

The letter mail may then be delivered to the recipient at mail box 37 at a faster or slower rate than that selected by the sender; held by the post for a specified amount of time and then delivered to an address specified by the recipient; opened, and the contents of the letter faxed to recipient's selected fax numbers and then the letter mail may be delivered to the physical address specified by the recipient; or opened, and the contents of the letter mail e-mailed to recipient's selected e-mail addresses and then the letter mail may be delivered to the physical address specified by the recipient. The recipient may also have instructed the post to return the mail to the sender, to destroy the mail, or to recycle the paper in the letter mail. Options 61 will also send the cost of the recipient's selected manner of delivery to bill recipient 66 so that data center 34 may inform the post to debit the recipient's account or send a bill to the recipient.

Figure 3:
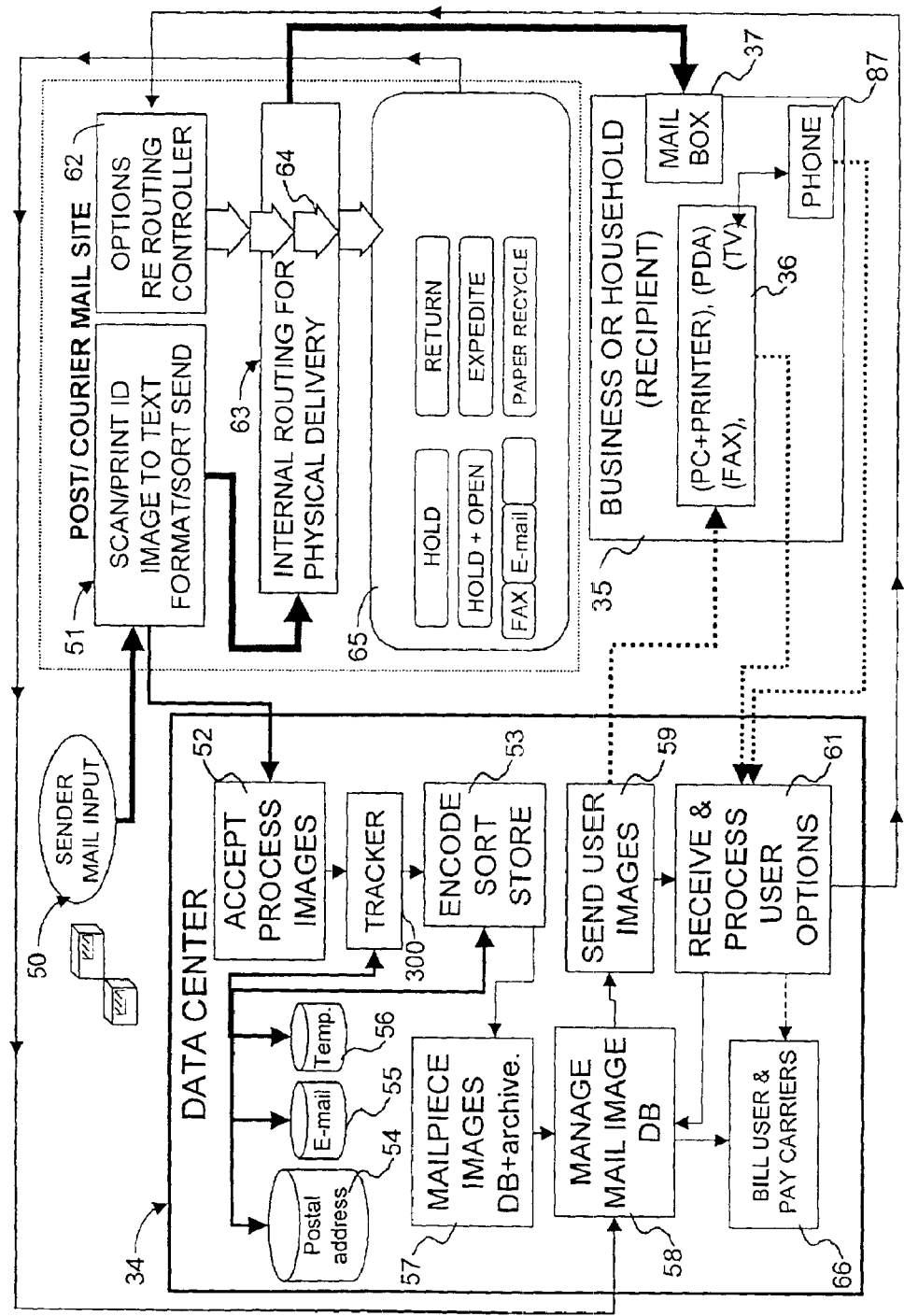
FIG. 3 is a drawing showing how this invention may be used by the post and/or a courier in the processing of flats and packages.

FIG. 3 is a drawing showing how this invention may be used by a post or courier in the processing of packages and flats. Packages and flats that are deposited with the carrier at 50 are scanned by scanner/coder 51. Scanner/coder 51 scans all of the information appearing on the face of the package or flat, i.e., (from FIG. 1D) the sender's address 41, the sender's phone number 44, the recipient's address 42, and courier symbology 43. The scanned information is coded, formatted and sorted, and the physical flat or package is sent to internal routing for physical delivery of the package or flat 63. The aforementioned information is transferred to accept process images 52, which is located at data center 34. Now the scanned information is transferred to missing persons tracker process 300. Process 300 hereinafter will be described in the description of FIG. 6. Then the information is sent to encode, sort, store 53. At this point the recipient's physical address is verified by checking postal address data base 54, and the recipient's e-mail address is determined from e-mail data base 55. Temporary data base 56 is then searched to determine whether or not the recipient has left any forwarding addresses. Encode 53 then encodes and sorts the information obtained from data bases 54, 55 and 56.

The aforementioned encoded and sorted information is stored in mail image archive data base 57. Then the package or flat image information is sent to manage mail image DB 58 where the various options and the costs associated therewith that the recipient may have for delivering the information contained in the package or flat are determined. Then the mail images and options that the recipient has for receiving the package or flat are sent to send user images 59, where the information appearing on the face of the package or flat in alphanumeric and graphic form and the options in alphanumeric and graphic form the recipient has for receiving the package or flat are transmitted to receiving device 36 (personal computer, television, facsimile machine, personal data assistant, etc.), which is located at the recipient's business or household 35. The recipient may use device 36 (personal computer, facsimile machine, personal data assistant, etc.), located at the recipient's business or household 35, to inform receive and process recipient options 61, located at data center 34, of the manner in which the package or flat should be delivered. The recipient may also use a touch tone and/or voice telephone 87 to inform options 61 of the manner in which the recipient would like the package or flat displayed on the receiving device 36, i.e., television delivered. For instance, the recipient may want the package or flat physically delivered to the recipient's house faster or slower; or the package or flat physically redirected to the recipient's temporary address; or physically delivered to the recipients agent; or physically delivered to the recipients attorney; or physically returned to the mailer; or have the post open the package or flat and have the post e-mail or fax the contents of the package or flat to the recipient and/or parties designated by the recipient.

At this juncture, the recipient may inform options 61 via a device 36 of the manner in which the recipient would like the package or flat processed. Options 61 will then inform the recipient via device 36 of the cost to the recipient to deliver the package or flat in the manner selected by the recipient. The recipient may then inform the carrier to deliver the package or flat in the manner selected by the recipient. The recipient's selected manner of package or flat delivery is forwarded to options rerouting controller 62. If the carrier's specified time to deliver the package or flat has not been reached, or the package or flat is at internal routing for physical processing 63, the package or flat will be sent to recipient options 62 and delivered in the manner selected by the recipient in route mail options 65. Then options 65 informs manage mail data base 58 to archive the image and also to notify bill sender and pay carriers 66 to bill the recipient and pay the carrier. At this point, the next package or flat image is ready to be processed.

The package or flat may then be delivered to the recipient at mail box 37 at a is faster or slower rate than that selected by the sender; held by the courier for a specified amount of time and then delivered to a address specified by the recipient; opened, and the contents of the package or flat faxed to recipient's selected fax numbers; opened, and the contents of the package or flat faxed to recipient's selected fax numbers and then the package or flat may be delivered to the physical address specified by the recipient; opened, and the contents of the package or flat e-mailed to recipient's selected e-mail addresses; or opened, and the contents of the package or flat e-mailed to recipient's selected e-mail addresses and then the package or flat may be delivered to the physical address specified by the recipient. The recipient may also have instructed the post or courier to return the mail to the sender or to destroy the contents of the package or flat or recycle the contents of the package or flat. Options 61 will also send the cost of the recipient's selected manner of delivery to bill recipient 66 so that the carrier may debit the recipient's account or send a bill to the recipient.

Figure 4:
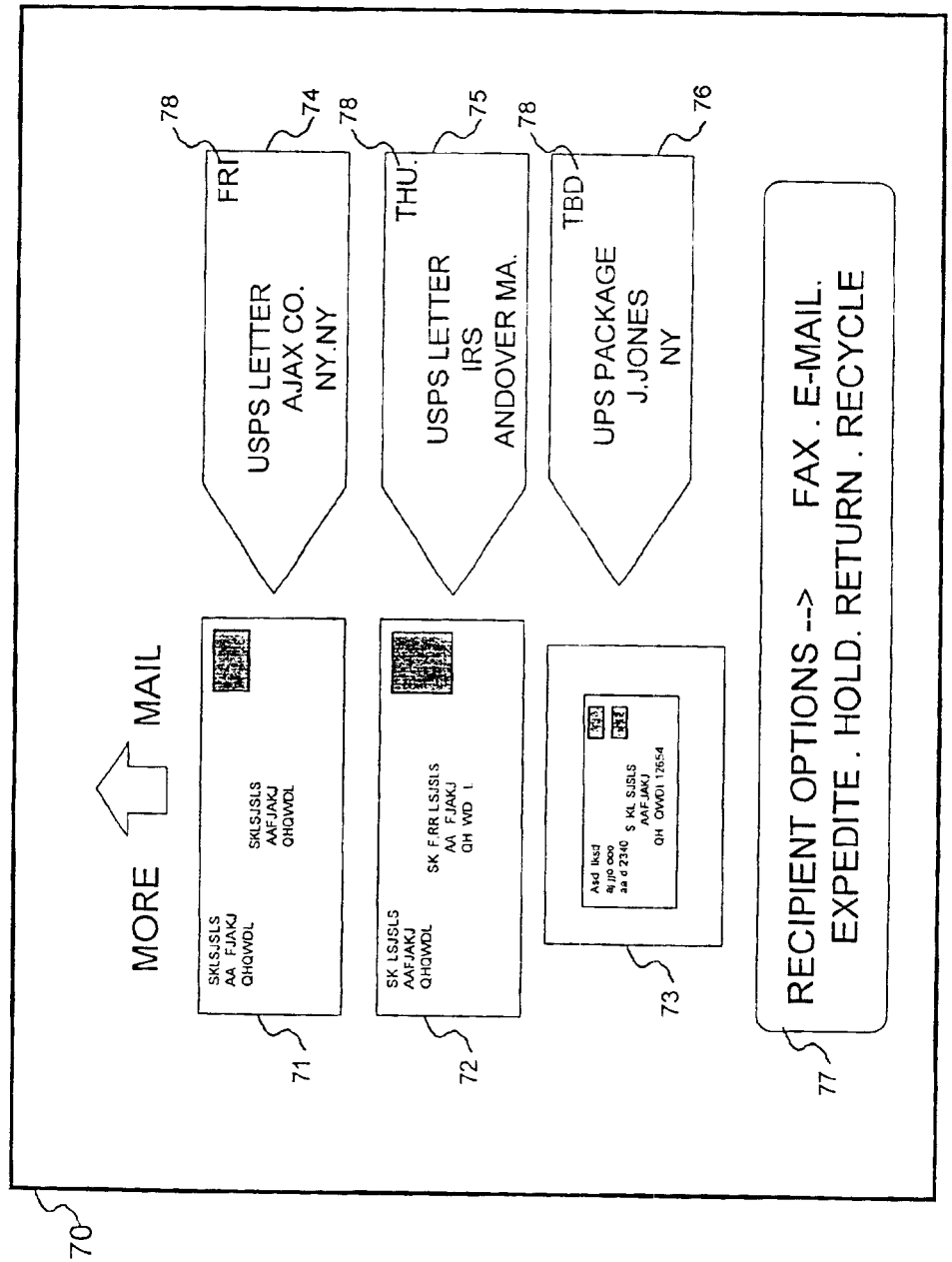
FIG. 4 is a drawing of the information that appears on one or more of receiving devices 36.

FIG. 4 is a drawing of the information that appears on one or more of receiving devices 36. The information may appear on the display of a personal computer, the screen of a television set, or paper 70 printed by a printer or facsimile machine. An image of the face of a letter mailpiece is shown at 71 and 72, and an image of the face of a flat or package is shown at 73. Data associated with letter mailpiece 71 is shown at 74, and data associated with letter mailpiece 72 is shown at 75. Data associated with package or flat 73 is shown at 76. The options that the recipient has for diverting the mail is shown at 77, and the estimated time of arrival of delivery is shown at 78.

Figure 5:
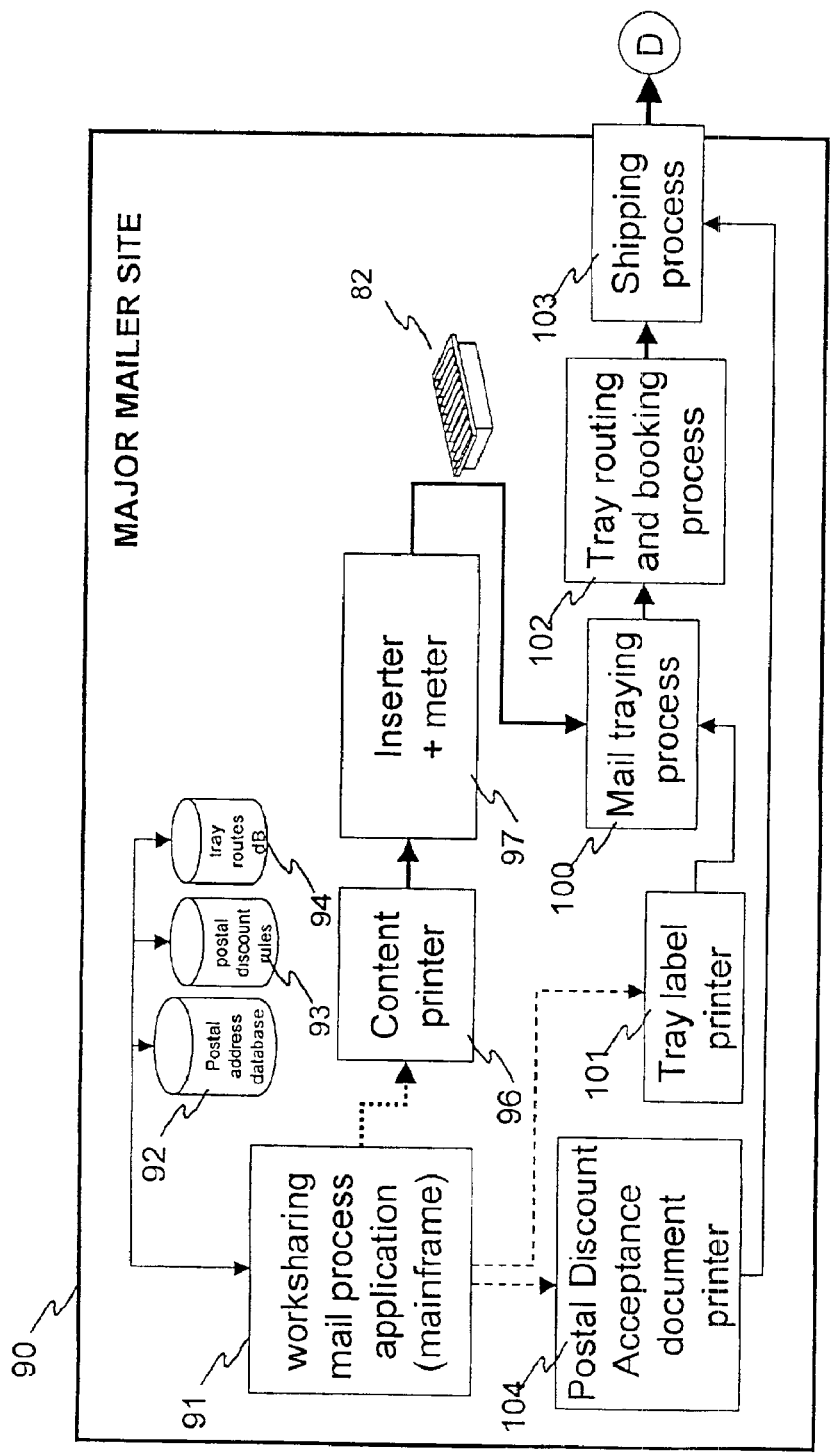
FIG. 5 is a drawing of major mailer site 90.

FIG. 5 is a drawing of major mailer site 90 that is used in the production of mailpieces for trays 82 (shown in FIG. 2). A mainframe computer 91 is located at site 90. Computer 91 performs preprocessing of the letter mailpiece by controlling the content and composition of the letter mailpiece as well as the address management, presortation postal requirements, and postal process bar code requirements. Computer 91 is coupled to postal address data base 92, postal discount rules 93, and tray routes database 94. Computer 91 utilizes data base 92, rules 93 and data base 94 to instruct content printer 96 to print the material that is required for the mailing, i.e., information appearing on the face of the letter mailpiece and material that is going to be inserted into the mailpiece. Inserter and meter 97 inserts the material into the correct mailpiece, seals the mailpiece, applies the correct postage to the mailpiece, places the mailpiece in the proper tray 82, and prepares documentation for the mailpieces in tray 82. Computer 91 will cause tray label printer 101 to print a label according to mail traying process 100 for the tray 82 that inserter and meter 97 is filling. Then the trays 82 containing the letter mailpieces go to tray routing and booking process 102 and shipping process 103. When the trays 82 are in shipping process 103, postal discount acceptance printer 104 will be instructed by computer 91 to print the proper postal documentation for the letter mailpieces in tray 82. After process 103 places the proper documentation in trays 82, trays 82 are ready to be shipped to delivery bar code sorter/code printer 25 or sequence bar code sorter/code printer 26 (FIG. 2).

Figure 6:
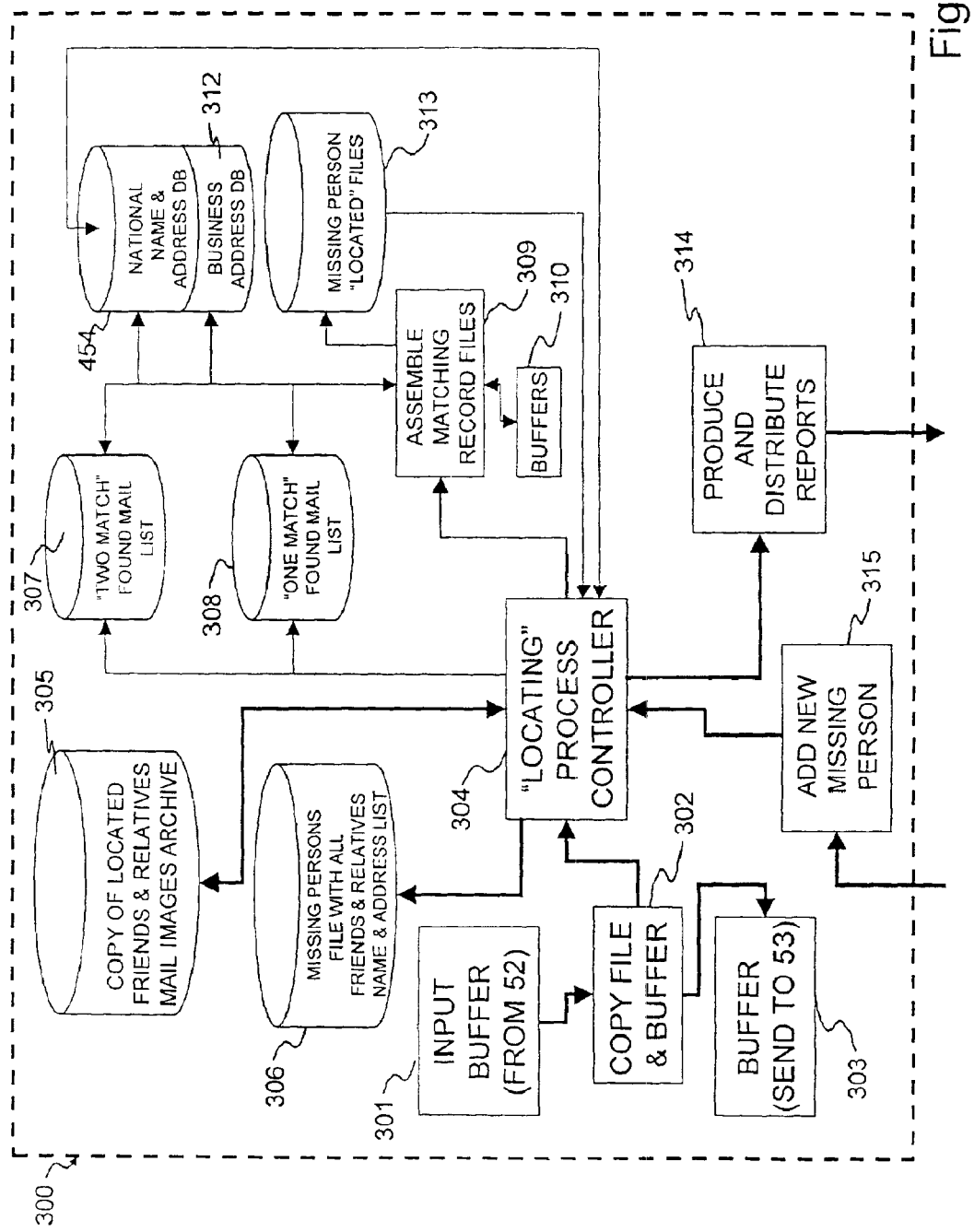
FIG. 6 is a drawing showing missing person tracker process 300.

FIG. 6 is a drawing showing missing person tracker process 300. Missing persons input buffer 301 receives the output of accept images 52 (FIG. 2 or FIG. 3). The output of images 52 will be a data base record file that is similar to the mailpiece data base record file described in FIG. 8. The data base record file is copied at 302 and then sent to buffer 303. Thereafter, the file is transmitted to encode, sort, store 53 (FIGS. 2 and 3). At this point the data base record file is sent to process controller 304. A flow chart describing the operation of controller 304 is described in FIGS. 7A–7C. Controller 304 is coupled to copy of captured friends and relatives mail images archive 305; missing persons file plus friends and relatives name and address list 306; two match found list 307; one match found list 308; assembly records file 309; national name and address data base 454; national business name and address data base 312; missing person located files 313; produce reports 314; and add missing person 315. Data base 454 maintains a national list of the name and postal address of every known person living in the United States and data base 312 maintains a national list of the name and postal address of businesses in the United States.

Archive 305 maintains images of the faces of mail of friends and relatives of the missing person. Controller 304 will check if the image of the mail presently being reviewed is similar to an image in archive 305. Controller 304 will utilize list 306 to determine whether or not the sender or receiver appearing on the face of the mail appears in list 306. If two matches are found between the sender and receiver appearing on the face of the mail and list 306, controller 304 will place the two matches in two match found mail list 307. If only one match is found between the sender and receiver appearing on the face of the mail and list 306, controller 304 will place the match in match found mail list 308.

Assemble matching records data file 309 will utilize lists 307 and 308, data bases 454 and 312, and missing persons located files 313 to process the matches found in lists 307 and 308 to produce a missing persons located file in 313. Files 309 will be buffered by buffer 310, processed, and then moved to missing person locating file 313. Controller 304 will cause produce reports 314 to assemble a missing person search report 400, that is described in the description of FIG. 9. Report 400 will include possible candidates for the missing person. Report 400 may be mailed by e-mail, physical mail, faxed, etc., to the party requesting that this invention find a missing person. A party wanting to find a missing person may send their request to add a missing person 315 by telephone, e-mail, physical mail, facsimile, etc. Controller 304 will cause the missing person added in 305 to be included in list 306. Controller 304 will also assign a case number 396 (FIG. 8) to the recently added missing person.

Figure 7A:
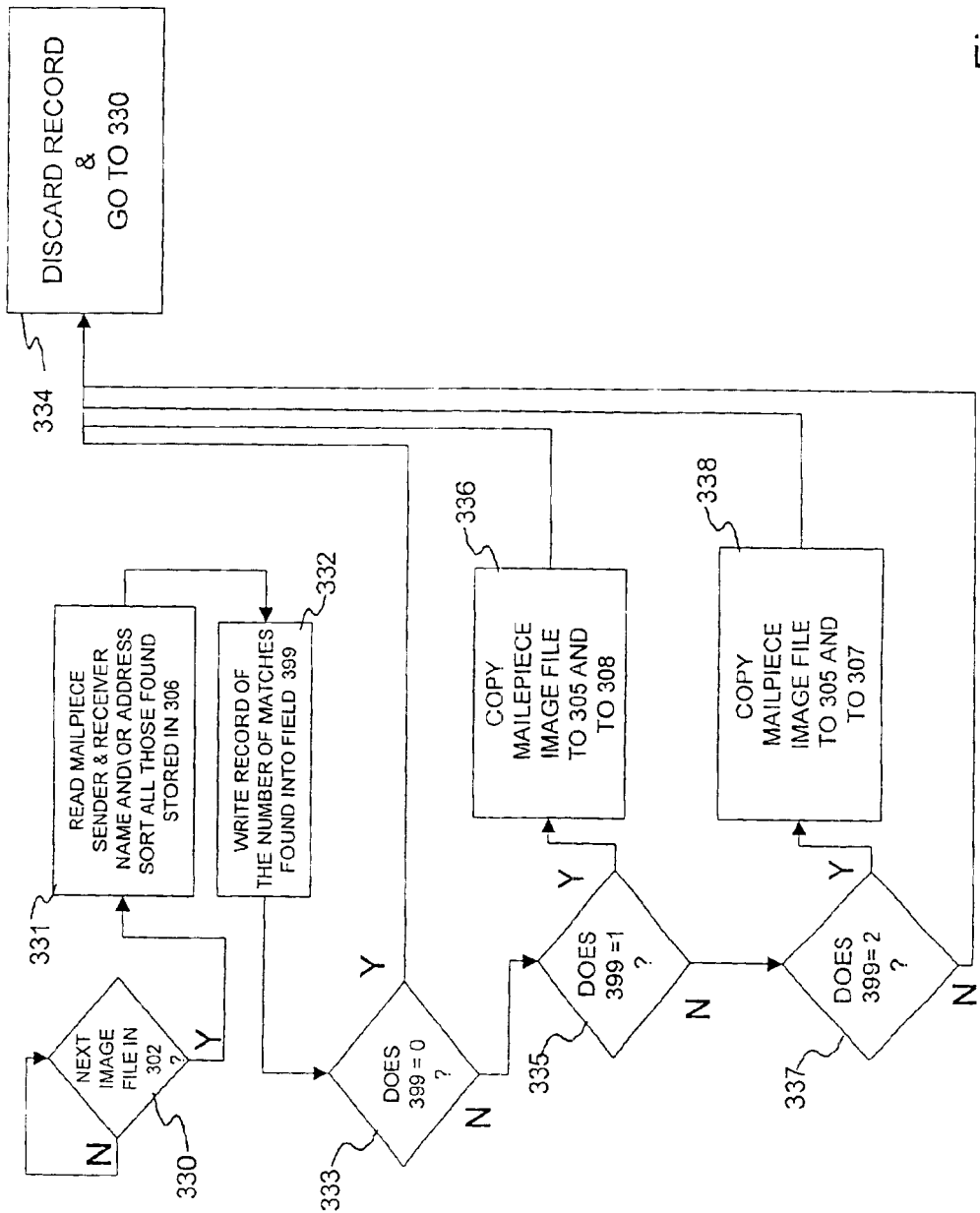
FIGS. 7A-7C are flow charts showing the operation of controller 304.
Figure 7B:
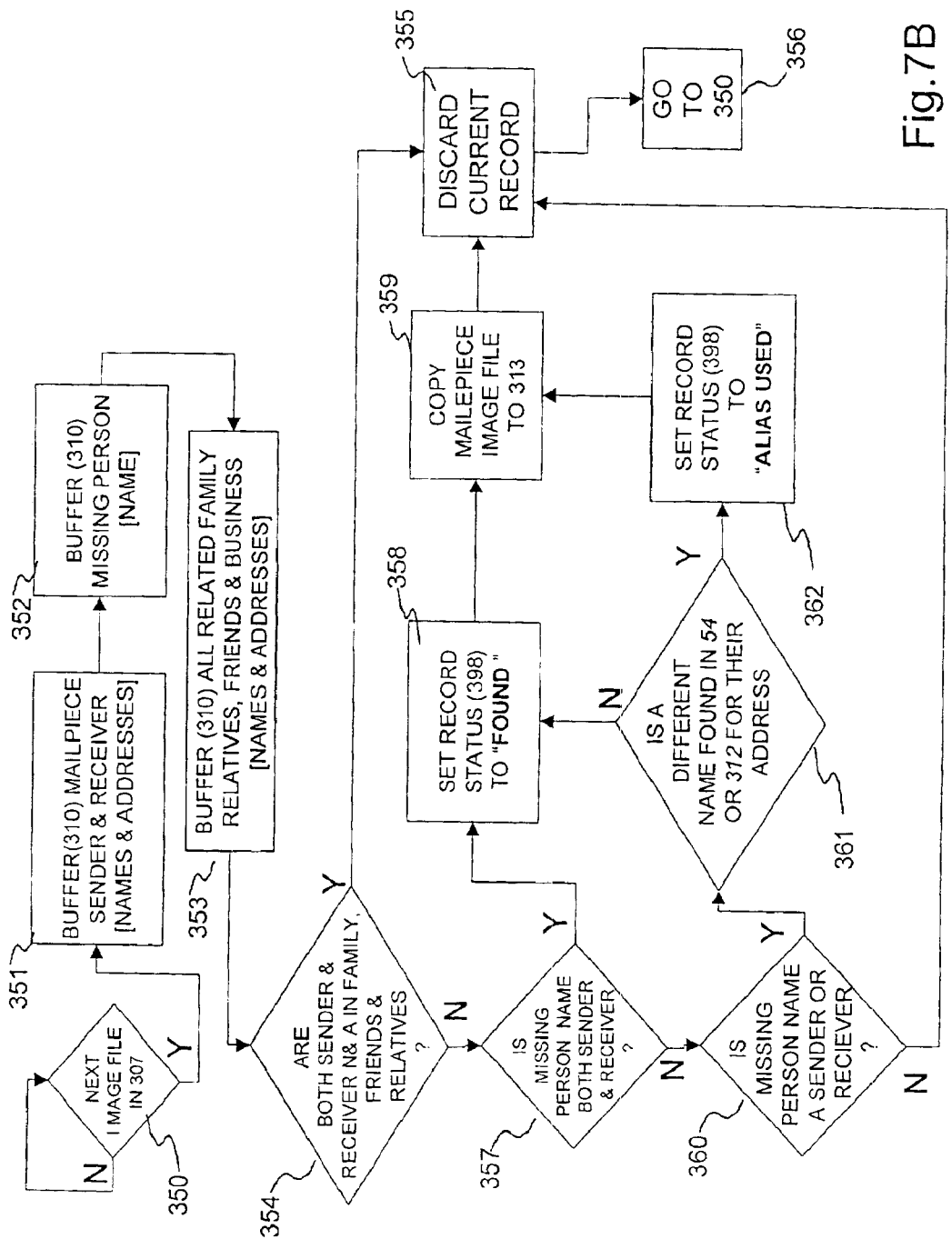
Figure 7C:
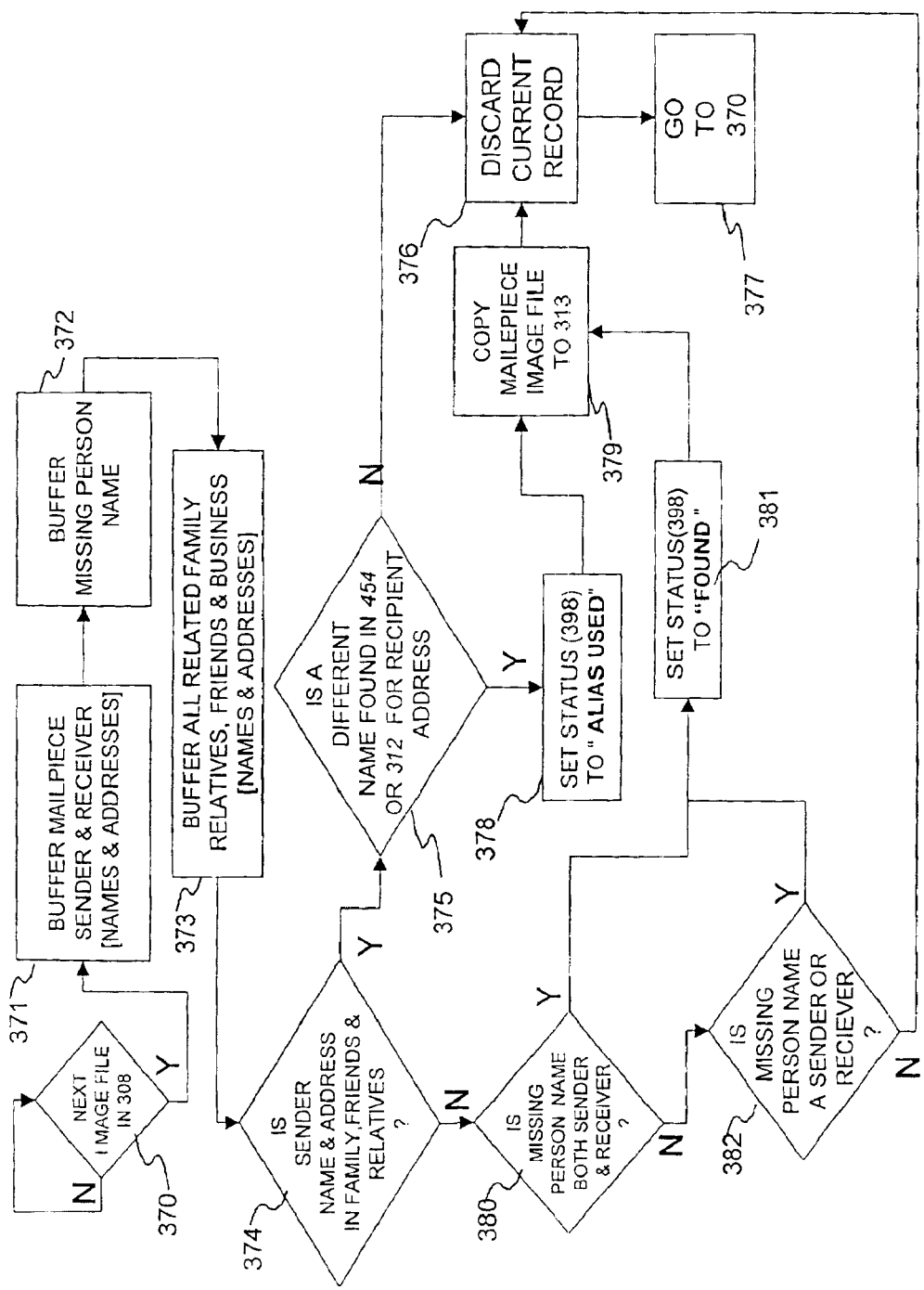
Figure 8:
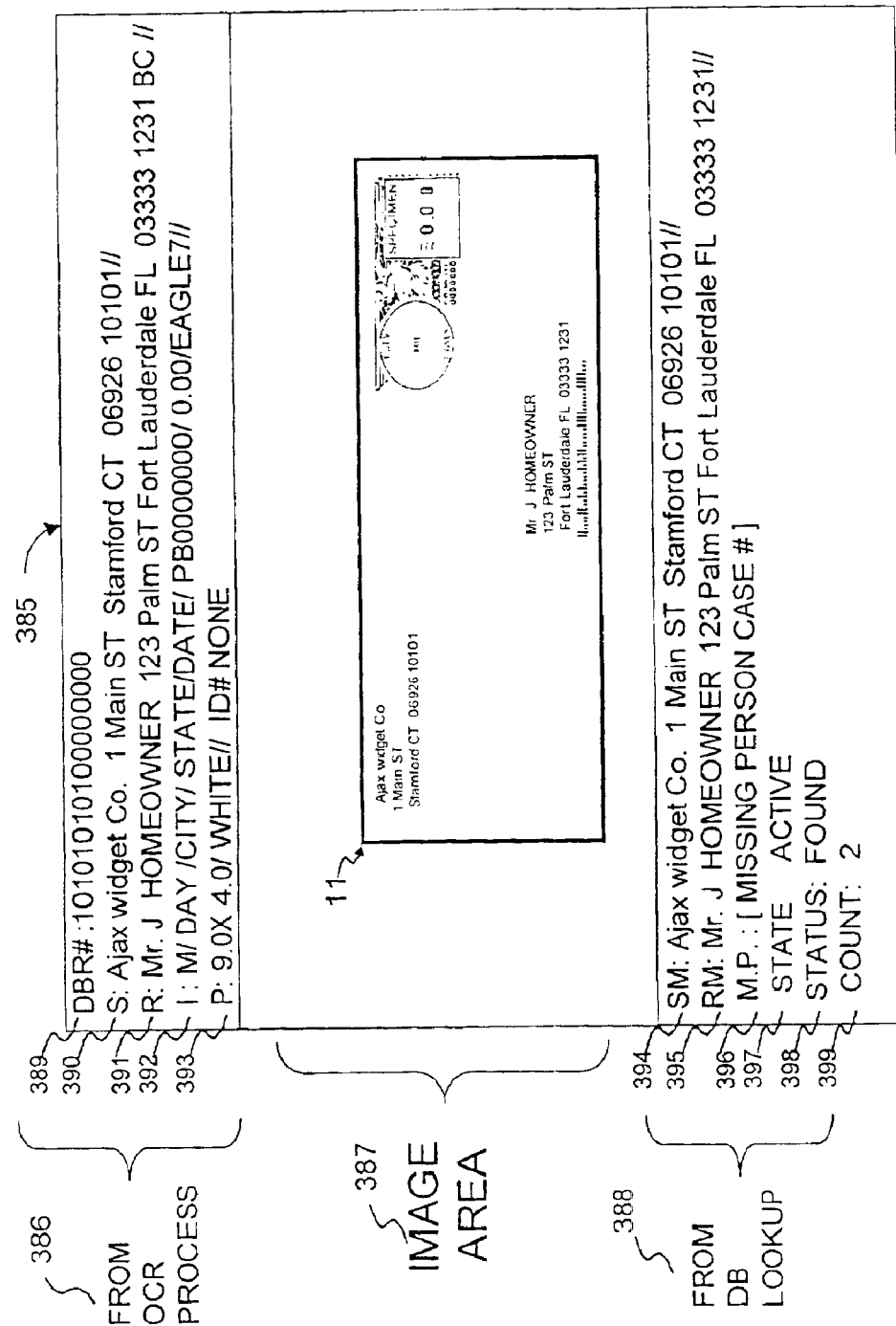
FIG. 8 is a drawing of record file 385 for a typical mailpiece.

FIGS. 7A–7C are flow charts showing the operation of controller 304 of FIG. 6. The program begins in decision block 330. Block 330 determines whether or not the next mail image file in buffer 302 is present. If block 330 determines that the next mail image file in buffer 302 is not present, the program goes back to the input of block 330. If block 330 determines that the next mail image file in buffer 302 (FIG. 6) is present, the program goes to block 331 to read the mailpiece sender and receiver name and/or address and see if they are stored in list 306. Then the program goes to block 332 to write a record of the number of matches found in item 399 (FIG. 8).

Now decision block 333 will determine the number of matches found. If block 333 determines that no match was found, a zero will be written in 399 (FIG. 8), and the program will go to block 334 to discard the record. Then the program will go back to the input of block 330. If block 333 determines that a match was found, the program goes to the input of decision block 335. Decision block 335 determines whether or not one match was found in block 332. If block 335 determines that no match was found in block 332, the program will go to block 336 to copy the mailpiece image file in archive 305 and list 308 (FIG. 6). Then the program will go to block 334 to discard the record. Now the program will go back to the input of block 330. If block 335 determines that a match was found in block 332, the program will go to decision block 337. Decision block 337 determines whether or not two matches were found in block 332. If block 337 determines that two matches were found in block 332, the program will go to block 338 to copy the mailpiece image file in archive 305 and list 307 (FIG. 6). Then the program will go to block 334 to discard the record. Now the program will go back to the input of block 330. If block 335 determines that two matches were found in block 332, the program will go to block 334 to discard the record. Now the program will go back to the input of block 330. The flow chart described in FIG. 7A is used when mail is flowing through the carrier and being processed.

The flow chart described in FIG. 7B illustrates how controller 304 (FIG. 6) processes matches that are found in list 307. The program begins in decision block 350. Block 350 determines whether or not the next mail image file in list 307 is present. If block 350 determines that the next mail image file in list 307 is not present, the program goes back to the input of block 350. If block 350 determines that the next mail image file in list 307 (FIG. 6) is present, the program goes to block 351 to place the sender and receiver names and addresses on the mailpieces in buffer 310. Then the program goes to block 352 to place the missing persons name in buffer 310. Now the program goes to block 353 to place all related family, relatives, friends, and businesses found in list 306 in buffer 310.

Then the program goes to decision block 354. Block 354 determines whether or not both the sender's and receiver's name and address are in block 353. If block 354 determines that the sender's and receiver's name and address are in block 353, the program will go to block 355 to discard the current record. Then the program will go to block 356 and then back to the input of block 350. If block 354 determines that the sender's and receiver's name and address are not in block 353, the program will go to decision block 357. Block 357 determines whether or not the missing person's name is both the sender and receiver. If block 357 determines that the missing person's name is both the sender and receiver, the program will go to block 358 to set the record status 398 (FIG. 8) to found. The reason why the missing person may have been found here is that the missing person may send mail to himself at a relatives home. Then the program will go to block 359 to copy the mailpiece image file in missing person located files 313 (FIG. 6). Now the program will go to block 355 to discard the current record. Then the program will go to block 356 and then back to the input of block 350. If block 357 determines that the missing person's name is not both the sender and receiver, the program will go to decision block 360. Block 360 will determine whether or not the missing person's name is indicated as a sender or a receiver. If block 360 determines that the missing person's name is indicated as a sender or receiver, the program will go to decision block 361. Block 361 determines whether or not a different name is found in data bases 454 and 312 (FIG. 6) for the listed address. If block 361 determines that a different name was not found in data bases 454 and 312 (FIG. 6), the program will go to block 358 to set the record status 398 (FIG. 8) to found. If block 361 determines that a different name was found in data bases 454 and 312 (FIG. 6), the program will go to block 362 to set the record status 398 to alias used. Then the program will go to block 359 to copy the mailpiece image in list 313. If block 360 determines that the missing person's name is not indicated as a sender or receiver, the program will go to block 355 discard current record. Then the program will go to block 356 and then back to the input of block 350. The program will continue processing until no further images are found in list 307.

The flow chart described in FIG. 7C illustrates how controller 304 (FIG. 6) processes matches that are found in list 308. The program begins in decision block 370. Block 370 determines whether or not the next mail image file in list 308 is present. If block 370 determines that the next mail image file in list 308 is not present, the program goes back to the input of block 370. If block 370 determines that the next mail image file in list 308 (FIG. 6) is present, the program goes to block 371 to place the sender's and receiver's name and address on the mailpieces in buffer 310. Then the program goes to block 372 to place the missing person's name in buffer 310. Now the program goes to block 373 to place all related family, relatives, friends, and businesses found in list 308 in buffer 310.

Then the program goes to decision block 374. Block 374 determines whether or not both the sender's and receiver's name and address are in block 373. If block 374 determines that the sender's and receiver's name and address are in block 373, the program will go to decision block 375. Block 375 determines whether or not a different name is found in data bases 454 and 312 (FIG. 6) for the listed address. If block 375 determines that a different name was found in data bases 454 and 312 (FIG. 6), the program will go to block 378 to set the record status 398 (FIG. 8) to alias used. Then the program will go to block 379 to copy the mailpiece image file in missing persons located file 313 (FIG. 6). Then the program will go to block 376 discard current record. Then the program will go to block 377 and then back to the input of block 370. If block 375 determines that a different name was not found in data bases 454 and 312 (FIG. 6), the program will go to block 376 discard current record. Then the program will go to block 377 and then back to the input of block 370. If block 374 determines that the sender's and receiver's name and address are not in block 373, the program will go to decision block 380. Block 380 determines whether or not the missing person's name is both the sender and receiver. If block 380 determines that the missing person's name is both the sender and receiver, the program will go to block 381 to set the record status 398 (FIG. 8) to found. The reason why the missing person may have been found here is that the missing person may send mail to himself at a relative's home. Then the program will go to block 379 to copy the mailpiece image file in missing person located files 313 (FIG. 6). Now the program will go to block 376 to discard the current record. Then the program will go to block 377 and then back to the input of block 370. If block 380 determines that the missing person's name is not both the sender and receiver, the program will go to decision block 382. Block 382 will determine whether or not the missing person's name is indicated as a sender or a receiver. If block 382 determines that the missing person's name is indicated as a sender or receiver, the program will go to block 381 to set status 398 (FIG. 8) to found. Then the program will go to blocks 379, 376, 377 and back to the input of 370. If block 382 determines that the missing person's name is not indicated as a sender or receiver, the program will go to block 376 to discard the current record. Then the program will go to block 377 and back to the input of block 370. The program will continue processing until no further images are found in list 308.

FIG. 8 is a drawing of a record file 385 for a typical mailpiece. File 385 includes an area 386 that represents matter obtained from scanning the mail, an image area 387 that shows an image of the face of the mail, i.e., mailpiece 11, and area 388 that represents information obtained from processing the scanned image of mailpiece 11. Area 386 includes item 389 that represents the data base record number for this file; item 390 that represents the name and address of the sender of letter mailpiece 11; item 391 that represents the name and address of the recipient of mailpiece 11; item 392 that represents information contained in the postal indicia of mailpiece 11; and item 393 that represents information regarding the physical characteristics of the envelope used for mailpiece 11.

Area 388 includes item 394, the name and address of the sender of letter mailpiece 11 that has been obtained from data base 454 (FIGS. 2 and 3). Item 395 represents the name and address of the recipient of letter mailpiece 11 that has been obtained from data base 454 (FIGS. 2 and 3). Item 396 indicates that represents the case number of the missing person. Item 397 indicates the state of the case. Item 398 indicates the status of this file, i.e., whether or not there was a match and whether the missing person may have been found. Item 399 indicates the number of matches found.

FIG. 9 is a drawing of a missing person search report 400. Report 400 was prepared for client 401 on date 402. Item 403 indicates a report for a specific relevant mailpiece that may indicate the missing person. Item 403 has a search identification number 404 for a mailpiece having an identification number 405; a missing person 406 having a name 407; and a mailing address 408. Item 409 indicates that the sender of mailpiece 11 was Ajax Widget Co. of 1 Main Street Stamford, Conn. 06926 1010, and that this address has been verified. Item 410 indicates that the receiver of mailpiece 11 is Mr. J. Homeowner of 123 Palm Street Fort Lauderdale, Fla. 03333 1231, and that this address has been verified.

Database derived information from mailpiece 411 indicates 1. That Ajax Widget Co. is in J. Homeowner Past Business Relations List; 2. Ajax Co. is the registered meter holder that was used to produce indicia 14 on mailpiece 11 and that the account for the meter that produced indicia 14 is currently valid; 3. Mary Homeowner, who is the mother of missing person J. Homeowner works at Ajax Widget Co.; and 4. A social security match was found in the State of Florida Department of Motor Vehicles for the recipient of mailpiece 11 and the missing person. Item 412 indicates the next report for a specific relevant mailpiece that may indicate the missing person.

The above specification describes a new and improved method that enables a carrier to find the address of a missing person. It is realized that the above description may indicate to those skilled in the art additional ways in which the principles of this invention may be used without departing from the spirit. Therefore, it is intended that this invention be limited only by the scope of the appended claims.

What is claimed is:

1. A method for aiding a carrier in the determination of the location of a missing person while the carrier is automatically processing mail, said method comprises the steps of:
   A. receiving a name of a missing person which is stored in a database;
   B. receiving a list of parties that the missing person is likely to receive mail from or send mail to which is stored in a database;
   C. utilizing a scanner to scan mail faces that have been deposited with the carrier by any sender of mail;
   D. comparing the scanned mail information to the name of the missing person and a party appearing on the list of parties which are stored in the database for producing a list of scanned names and addresses in an alphanumeric format that includes the name of the missing person and the party appearing on the list of parties;
   E. delivering the produced list to a party that is permitted by law to receive the list regarding mail that the missing person may have sent or received; and
   F. reviewing the delivered list to determine if the missing person is the recipient or sender of mail that is listed on the delivered list.

2. The method claimed in claim 1, further including the step of: checking that the person who appears on the delivered list is likely to be the missing person.

3. The method claimed in claim 2, further including the step of charging the recipient of the delivered list for checking that the person who appears on the delivered list is likely to be the missing person.

4. The method claimed in claim 1, further including the step of charging the recipient of the delivered list for producing a list of scanned names and addresses.

5. The method claimed in claim 1, further including the step of delivering a reproduction of the image of the mail face scanned in step C that also includes the name of the missing person and a party appearing on the list of parties.

6. A method for aiding in the determination of the location of a missing person using an alias while the carrier is automatically processing mail, said method comprises the steps of:
   A. receiving a name of a missing person which is stored in a database;
   B. receiving a list of parties that the missing person is likely to receive mail from or send mail to which is stored in a database;
   C. utilizing a scanner to scan mail faces that have been deposited with the carrier by any sender of mail;
   D. comparing the scanned mail information to an alias of the missing person and a party appearing on the list of parties which are stored in the database for producing a list of scanned names and addresses in an alphanumeric format that includes the name of the missing person and the party appearing on the list of parties;
   E. delivering the produced list to a party that is permitted by law to receive the list regarding mail that the missing person may have sent or received; and
   F. reviewing the delivered list to determine if the missing person is the recipient or sender of mail that is listed on the delivered list.

7. The method claimed in claim 6, further including the step of: checking that the person who appears on the delivered list is likely to be the missing person.

8. The method claimed in claim 7, further including the step of charging the recipient of the delivered list for checking that the person who appears on the delivered list is likely to be the missing person.

9. The method claimed in claim 6, further including the step of charging the recipient for producing a list of scanned names and addresses.

10. The method claimed in claim 6, further including the step of delivering a reproduction of the image of the mail face scanned in step C that also includes the name of the missing person and a party appearing on the list of parties.

* * * * *